United States Patent [19]

Potter

[11] 4,008,056

[45] Feb. 15, 1977

[54] SCRUBBER SYSTEM FOR REMOVING GASEOUS POLLUTANTS FROM A MOVING GAS STREAM BY CONDENSATION

[76] Inventor: George Potter, 680 "F" St., Eastside, Oreg. 97420

[22] Filed: Sept. 29, 1975

[21] Appl. No.: 617,598

[52] U.S. Cl. .................................. 55/92; 55/85; 55/228; 55/238; 55/267; 55/348; 55/421; 55/457; 261/17; 261/79 A; 261/126; 210/221 P; 110/119
[51] Int. Cl.² .................................... B01D 47/12
[58] Field of Search ............ 55/85, 89, 92, 94, 228, 55/229, 236–238, 235, 257 PV, 258, 260, 421, 456, 457, 345, 346, 348, 267, 84; 261/79 A, 17, 126, 79 R; 210/44, 221 P, 74; 110/119, 128; 266/147, 157; 98/58–60

[56] References Cited

UNITED STATES PATENTS

| | | | |
|---|---|---|---|
| 2,259,033 | 10/1941 | Fisher | 55/257 PV |
| 2,409,088 | 10/1946 | Weits et al. | 55/238 |
| 2,575,359 | 11/1951 | Ortgies | 55/238 |
| 2,587,416 | 2/1952 | Vedder | 55/235 |
| 2,653,674 | 9/1953 | Ortgies | 261/126 |
| 2,920,763 | 1/1960 | Lind et al. | 210/221 P |
| 3,175,687 | 3/1965 | Jones | 210/221 P |
| 3,457,169 | 7/1969 | Schneider | 210/23 |
| 3,526,082 | 9/1970 | Thuillier | 261/79 A |
| 3,643,404 | 2/1972 | Ronning | 55/238 |
| 3,701,237 | 10/1972 | Smuck | 55/345 |
| 3,831,758 | 8/1974 | Watson, Jr. et al. | 210/221 P |

FOREIGN PATENTS OR APPLICATIONS

482,594   4/1938   United Kingdom ............ 55/238

*Primary Examiner*—Frank W. Lutter
*Assistant Examiner*—David L. Lacey
*Attorney, Agent, or Firm*—Chernoff & Vilhauer

[57] ABSTRACT

A gas scrubbing system comprising a plurality of water-fed scrubber units each coupled to a respective exhaust stack of a conventional hot-air dryer and each receiving its water supply from a common, centralized, skimmer-type water treatment facility. Non-aqueous gaseous pollutants, such as hydrocarbons, extracted in vapor form from wood or other material within the dryers by a stream of heated drying gas, is condensed from the drying gas prior to exhausting such gas to the atmosphere by conducting the gas through a plurality of scrubber stages in the presence of cooling spray water until the temperature of the gas, due to the effects of heat transfer, has dropped below the condensation temperature of the gaseous pollutants. The condensed liquified pollutants are then removed from the gas by contact with the water spray and conveyed from the scrubbers along with the spray water while the cleansed gas stream is vented to the atmosphere. A centralized, skimmer-type water treatment facility connected to each of the scrubbers is provided to receive the spray water and separate the condensed non-aqueous pollutants therefrom, thereby permitting the spray water to be recirculated back through the scrubbers for reuse and the pollutants to be reclaimed if desired.

8 Claims, 7 Drawing Figures

SCRUBBER SYSTEM FOR REMOVING GASEOUS POLLUTANTS FROM A MOVING GAS STREAM BY CONDENSATION

BACKGROUND OF THE INVENTION

The present invention relates to a gas scrubbing system for removing gaseous pollutants, particularly hydrocarbons, from a moving stream of heated gas by means of temperature reduction and resultant condensation of the pollutants. Although there are scrubbing devices known to the art for cleansing material from a moving stream of gas, most of the known prior art devices are capable of removing only particulate matter and all are relatively ineffective in removing vapors. Examples of known prior art scrubbing devices include those disclosed by Bauer U.S. Pat. No. 1,110,868, Frey U.S. Pat. No. 1,999,589 and Weits et al U.S. Pat. No. 2,409,088, each of which includes a chamber through which a stream of gas is moved, circulating means within the chamber for imparting cyclonic movement to the gas, and a plurality of spray heads also positioned within the chamber for producing a water spray through which the gas must pass before it is vented to the atmosphere. Particulate matter carried by the gas is contacted by the water spray and carried out of the chamber with the spray water. These devices are relatively ineffective in removing non-particulate or gaseous matter from the moving gas stream because of their reliance solely upon mechanical contact between the spray water and the material to be removed, and their failure to incorporate features maximizing the transfer of heat from the gas to the spray water and the reduction of the temperature of the gas.

A significant disadvantage of several known prior art devices, in addition to their inability to efficiently remove non-particulate matter from gas streams, is that the water used to create the water spray is simply discharged as waste water once it has passed through the device. Those known prior art devices that do recirculate the water to the spray heads for reuse do so on an inefficient individual basis requiring a separate water circulation system for each gas-cleansing device. Examples of such devices include those disclosed by Tailor U.S. Pat. No. 3,050,919, Wisting U.S. Pat. No. 3,336,733, and Hoad U.S. Pat. No. 3,841,060, each of which includes a water recirculating system and an individual separator of a simple design better adapted to the relatively easy task of removing particulate pollutants from the water than the more difficult task of removing condensed gaseous pollutants.

SUMMARY OF THE INVENTION

The present invention is directed to a gas scrubbing system capable of efficiently removing vaporized non-aqueous pollutants from a moving stream of heated gas. More particularly, the gas scrubbing system of the present invention comprises a plurality of water-fed condenser-type, gas scrubber units each of which is coupled to an exhaust stack of a conventional hot-air dryer for condensing non-aqueous gaseous pollutants from the heated gas stream emanating from the dryer and then washing the condensed liquified pollutants from the gas stream by means of a water spray. Each unit receives clean spray water from, and discharges pollutant-carrying water to, a common centralized skimmer-type water treatment facility for efficiently cleansing the water of the condensed pollutants before recirculating the water back to the scrubber units for reuse.

The gas scrubber units employed in the present system each comprises an enclosure defining a pair of interconnected chambers, the first of which is coupled to the dryer exhaust stack and the second of which is vented to the atmosphere. Heated exhaust gas emanating from the dryer stack and containing vaporized water and gaseous pollutants, for example hydrocarbons from wood drying, is input to the first chamber of the scrubber unit at a temperature usually above the condensation temperature of the pollutant vapors. Immediately upon entering the first chamber, which is of substantially larger cross-section than the stack, the gas is deflected outwardly toward the periphery of the chamber in a cyclonic manner about the longitudinal axis of the chamber and exposed to a cooling water spray. Additonally, the gas is exposed to a veil of falling water formed by spray water running off the edges of a spray shield positioned over the gas inlet. The resultant cooling action, from the heat transfer resulting from the passage of the gas through the water veil and water spray cools the gas rapidly to a temperature below the condensation temperature of the pollutant vapors. As the non-aqueous vapors condense into moisture, they are contacted by the water spray or brought into contact with the spray-drenched walls of the chamber and captured by the water for conveyance from the chamber with the water through a drain formed in the chamber base.

The second chamber of the scrubber unit is positioned directly above the first chamber and interconnected thereto to receive the gas from the first chamber after it passes through the water spray. In this second chamber, the gas is first passed through a narrowed opening and then deflected outwardly toward the periphery of the chamber in a cyclonic manner in the presence of one or more additional water sprays and an additional water veil formed by spray water falling from the edges of a second spray shield positioned over the inlet to the chamber. The resultant further cooling of the gas causes the non-aqueous pollutant vapors remaining in the gas to condense into moisture and be captured by the water spray as in the first chamber for conduction from the scrubber unit with the spray water. An annular drain is provided at the base of the second chamber to discharge the spray water as a second cylindrical veil about the gas inlet of the first chamber. Finally, the gas stream is vented from the scrubber unit to the atmosphere through a vaned baffle extending over the outlet of the second chamber to entrap any non-aqueous moisture or spray water remaining in the gas stream after it passes through the last or uppermost water spray to prevent such moisture from being exhausted to the atmosphere.

Thus, a heated gas stream entering the enclosure of the gas scrubber unit is cyclonically deflected and cooled initially and most rapidly in the first chamber where it is exposed both to a water spray and a plurality of concentric cascading water veils, and further cyclonically deflected and cooled in the second chamber where it is exposed to an additional water veil and additional water sprays before it is vented to the atmosphere through a vaned moisture-entrapment baffle.

The respective scrubber units are decentralized, each being coupled to a separate stack, to save the substantial expense of installing and operating an air pumping system, including an extensive network of conduits, from the stacks to a central exhaust gas treatment unit.

Spray water carrying the captured non-aqueous moisture from the plurality of scrubber units is fed to a common, centralized, water treatment facility where it is cleansed of the non-aqueous moisture in a much more efficient manner than would be practical with decentralized water cleaning units. The water treatment facility comprises a water-holding tank having means for receiving spray water from the scrubber units, cleansing it and recirculating it back to the scrubbers. A laterally extending array of air jets is positioned proximate the bottom of the tank below the level of a water reservoir maintained therein and releases air under pressure into the path of the water as it moves from inlet to outlet of the tank. The released air, rising to the surface of the water as bubbles, drives the non-aqueous moisture contained in the spray water toward the surface where it remains as foam. A rotating drum positioned downstream from the air-jet array and partially immersed in the spray water reservoir then adheringly lifts the foam from the water surface and transfers it to a skimmer blade in sliding contact with the surface of the drum. The skimmed moisture slides down a trough into a suitable receptacle.

As the reclaimed non-aqueous moisture is relatively pure, it may be salvaged for subsequent use. For example, if the non-aqueous moisture comprises hydrocarbon resins extracted from wood products dried in the dryers, the resins can be utilized in the production of varnishes, lacquers, plastics and the like.

Once past the rotating drum and cleansed of its non-aqueous moisture, the spray water is recirculated through the scrubber units for reuse. In this manner, the same spray water may be reused indefinitely with the only additional water being that required to replace the water lost due to evaporation.

It is, therefore, a principal objective of the present invention to provide an improved gas scrubbing system capable of more effectively removing gaseous pollutants from a moving stream of heated gas by means of temperature reduction and resultant condensation of the pollutants.

It is an additonal objective of the present invention to provide a gas scrubbing system that includes a plurality of condenser-type scrubber units connected to respective individual exhaust stacks and all coupled to a common centralized water treatment facility capable of efficiently separating condensed non-aqueous moisture from the water circulating through such scrubber units and recirculating such water to the respesctive units for reuse.

The foregoing objectives, features and advantages of the present invention will be more readily understood upon consideration of the following detailed description of the invention taken in conjunction with the accompanying drawings.

DESCRIPTION OF THE PREFERRED EMBODIMENT

Figure 1:
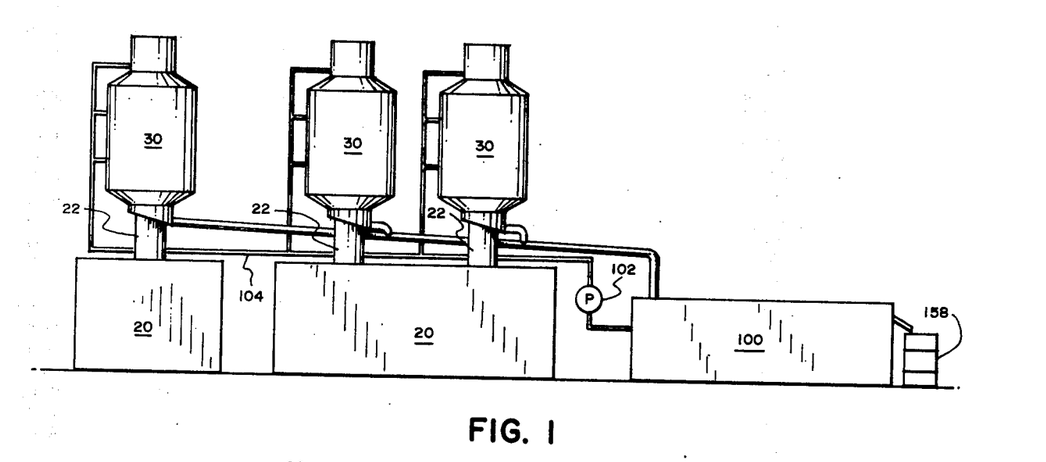
FIG. 1 is a partially schematic diagram of an exemplary embodiment of the gas scrubbing system of the present invention.

Referring to FIG. 1, the gas scrubbing condenser system of the present invention is seen to be mounted on a plurality of conventional hot-air dryers 20, and comprises a plurality of upright, water-fed, gas scrubber units 30 each attached to a separate exhaust stack 22. Water for the gas scrubber units 30 is supplied via a water circulating network 104 from a water treatment facility 100 to which the water is returned for cleansing after it has been circulated through the scrubber units. A water pump 102 is included in the water circulating network to provide the driving force necessary to deliver the water from the water treatment facility 100 to each of the gas scrubber units 30.

Figure 2:
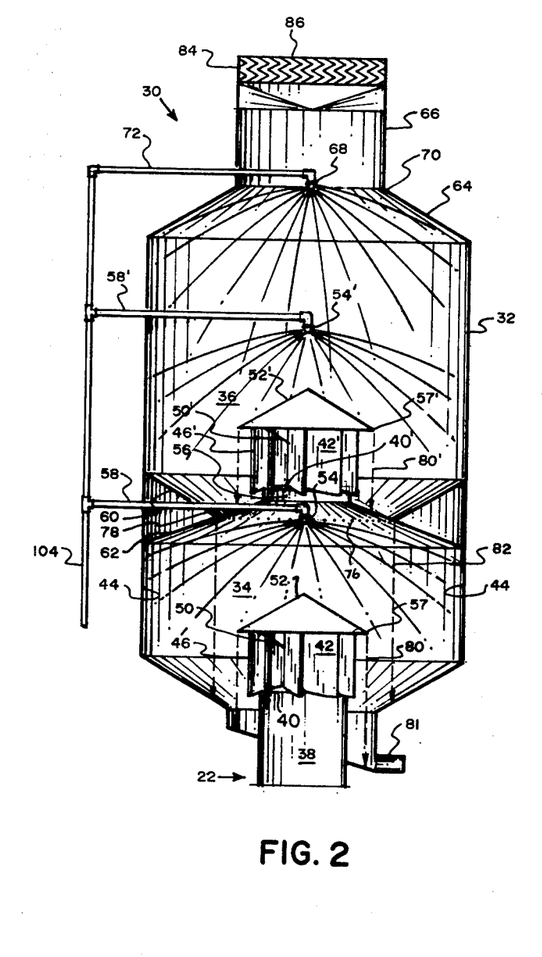
FIG. 2 is a sectional elevation of a gas scrubber unit employed in the gas scrubbing system of FIG. 1.

Referring now to FIG. 2, the gas scrubber unit 30 forming a part of the gas scrubbing system of the present invention is seen to include an elongate upright enclosure 32, the interior of which is divided into a first or lower chamber 34 and a second or upper chamber 36. A gas inlet duct 38 is sealingly attached to the base of the lower chamber 34 to connect the chamber to an exhaust stack 22 of one of the hot-air dryers 20. The inlet duct 38 has a horizontal cross-sectional area substantially less than that of the lower chamber 34.

Figure 3:
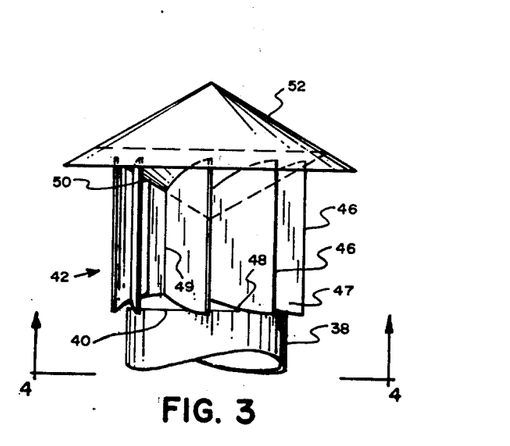
FIG. 3 is an enlarged elevation of the gas deflector and spray shield of the scrubber unit of FIG. 2.
Figure 4:
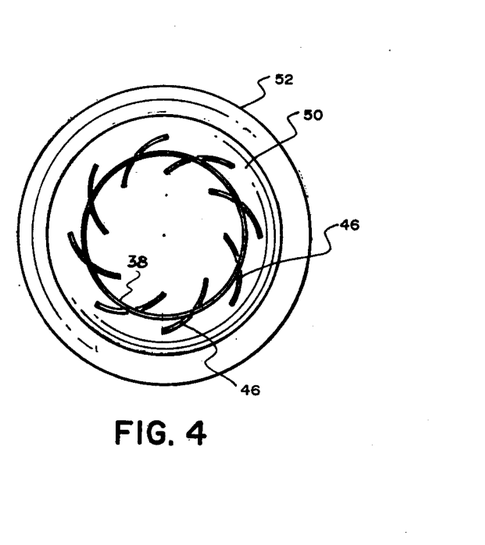
FIG. 4 is a sectional view of the gas deflector taken along the line 4—4 of FIG. 3.

Positioned immediately above and surrounding the top 40 of the inlet duct 38, and shown in detail in FIGS. 3 and 4, is a combination gas deflector and circulator 42 for directing a gas stream entering the lower chamber 34 from the dryer exhaust stack 22 radially outward in a swirling cyclonic-like manner toward the peripheral sides 44 of the chamber. The gas deflector/circulator 42 comprises a plurality of vertically-oriented arcuate vanes 46 arranged in a ring having an outside diameter greater than that of the inlet duct 38. The vanes 36 are attached at their lower ends to the top 40 of the duct 38 by any suitable means such as by weldment or screws. Attached to the top of the vanes 46 and positioned coaxially with a vertically-oriented line through the center of the ring formed by the vanes is an inverted lower cone 50 having a base diameter greater than the outside diameter of the vane ring and an upright upper cone 52 having a base diameter greater than that of the lower cone. As described more fully below, the lower cone 50 serves as a radial deflector for the incoming gas stream and upper cone 52 serves as a spray shield to prevent water from an overhead spray nozzle from entering the gas inlet duct 38 and also to create a cylindrical veil of water surrounding the inlet. Note that the bottom edge 48 of each vane 46 slopes downwardly from the interior edge 49 of the vane to the top 40 of the duct 38 were it communicates with a portion 47 of the vane wholly outside of the duct to ensure that any spray water or other liquid contacting the vanes will run down the bottom edge of the vane and into the chamber 34 rather than dropping into the inlet duct 38.

Referring again to FIG. 2, the gas scrubber unit 30 is seen to further include within the lower chamber 34 a spray nozzle 54 disposed directly above the gas deflector/circulator 42 and proximate an orifice 56 formed in the center of the top of the chamber. The spray nozzle 54 is preferably of the tangential hollow cone-type capable of producing a swirling umbrella-like spray pattern having a vertical cross-section substantially as shown in the figure. The spray should contact the peripheral sides 44 of the chamber at a point slightly below the level of the nozzle and extend down to a point just above the periphery 57 of the upper cone 52 of the gas deflector/circulator 42, thus leaving a substantially conical-shaped spray-free space directly below the spray nozzle 54. Suitable hollow cone nozzles are readily available from several manufacturers, for example the Spray Engineering Company, Burlington, Massachusetts 01803. Water for the spray nozzle is supplied through a conduit 58 from the water treatment facility 100 described more fully below.

The second or upper chamber 36 is sealingly attached at its lower end 60 to the upper end 62 of the lower chamber 34 around the orifice 56 formed therein such that a gas may flow from the lower chamber to the upper chamber through the orifice. The orifice 56 is substantially smaller in horizontal cross-sectional area than the chamber 36, having a cross-section approximately equal to or larger than that of the gas inlet duct 38. A second gas deflector/circulator 42', substantially identical to the aforementioned gas deflector/circulator 42 of the lower chamber 34, is positioned directly above the orifice 56 leading into the upper chamber 36 and secured, as before, by attachment of their lower ends to the top 40' of the orifice 56 by any suitable means. Cones 50' and 52' similar in all respects to cones 50 and 52 are provided. Also as before, a second hollow cone-type spray nozzle 54' is disposed directly above the gas deflector circulator 42' and supplied with water from the water treatment facility 100 via conduit 58' to produce a swirling umbrella-like spray substantially identical to that produced by the first or lower spray nozzle 54.

The upper end 64 of the upper chamber 36 terminates in an exhaust duct 66 for venting a gas moving through the chamber upwardly into the atmosphere. A third spray nozzle 68 is disposed in the center of the juncture 70 between the upper end 64 of the upper chamber 36 and the lower end of the exhaust duct 66. This spray nozzle 68, also connected to the water treatment facility 100 via a conduit 72, differs from the previous spray nozzles 54 and 54' in that it is of the full cone-type producing a uniform swirling spray pattern that radiates outwardly and downwardly in all directions, leaving no conical-shaped spray-free space below the nozzle. Suitable full cone nozzles are also readily available from several manufacturers including the aforementioned spray Engineering Company.

Finally, a multi-louvered baffle 84 is positioned atop the exhaust duct 66 to extend across the interface between the exhaust duct and the atmosphere.

In operation, a stream of heated gas entering the gas scrubber unit via the inlet duct 38 impinges upon the lower cone 50 of the gas deflector/circulator 42 and is directed radially outwardly through the vanes 48 in a swirling cyclonic-like manner toward the periphery 44 of the lower chamber 34. Immediately upon leaving the gas deflector/circulator 42, the gas passes through two cylindrical veils of falling water 80 and 82 respectively, the first created by spray water from the lower spray nozzle 54 running off the upper cone 52 of the gas deflector/circulator, and the second caused by spray water from the second spray nozzle 54' located in the upper chamber 36 draining through an annular arrangement of drain apertures 76 formed around the juncture 78 between the upper and lower chambers. As mentioned earlier, besides forming the water veil 80 around the gas deflector/circulator 42, the upper cone 52 also prevents spray water from the spray nozzle 54 from entering the gas inlet duct 38 and the sloping edges 48 of the vanes 46 ensure that any moisture that does enter the deflector/circulator and impinge upon the vanes will also be prevented from entering the duct 38. The passage through the veils causes a reduction of gas temperature as heat is transferred from the gas to the water.

As the gas swirls out toward the periphery 44 of the lower chamber 34 it encounters the cooling water spray produced by spray nozzle 54 causing a further drop in the temperature of the gas as a result of further heat transfer. To provide maximum exposure of the gas to the water spray, the spray pattern emanating from the nozzle 54 is swirled in a direction opposite that of the upwardly swirling gas stream.

Thus, the gas entering the lower chamber 34 is cooled by heat transfer incident to its exposure to the water veils 80, 82 and especially the cooling water spray emanating from the spray nozzle 54 which produces fine droplets having a very large total surface area for maximizing heat transfer. The ambient temperature of the spray water is substantially less than the condensation temperature of the pollutants and the resultant rapid cooling of the entering gas causes nonaqueous pollutant vapors carried by the gas to be condensed into a moisture which is then contacted by the spray water emanating from spray nozzle 54, carried to the sides of the chamber, and conveyed from the chamber with the spray water through a drain 81. In addition, the outwardly swirling motion imparted to the gas as it leaves the gas deflector/circulator 42 causes the moisture as it is formed to be thrown outwardly toward the periphery of the chamber where it contacts and adheres to spray water running down the walls of the chamber.

Clogging of the spray nozzle 54 by the condensed resinous pollutants, which can be a serious problem in a unit of this type which operates primarily on the principle of condensation by means of fine water sprays, is prevented by the outwardly spiraling spray pattern produced by the nozzle and the conical-shaped spray-free space directly below the nozzle. The outwardly spiraling spray tends to direct the rising gas stream, approaching from the side, away from the nozzle while the inner conical spray-free space insures that condensation is inhibited in the area directly beneath the nozzle so as to minimize the formation of condensed pollutant resins in such area and prevent their rising into contact with the nozzle.

As the gas stream progresses from the lower chamber 34, through the interconnecting orifice 56, and into the upper chamber 36, it is again directed radially outward in a swirling cyclonic manner by the second gas deflector/circulator 42' connected to the orifice 56. Upon leaving the gas deflector/circulator 42', the gas passes through the cylindrical veil 80' of spray running off of the periphery 57' of the upper cone 52' forming a part of the gas deflector/circulator 42', and then moves ourwardly into the path of the spray emanating from the spray nozzle 54'. The resultant further cooling of the gas by heat transfer due to exposure to the cooling spray water further condenses any remaining nonaqueous pollutant vapors carried by the gas to a moisture which will be contacted and captured by the spray water emanating from the spray nozzle 54' and by the spray water running down the sides of the chamber as described earlier relative to the lower chamber 34.

The swirling gas stream continues upwardly into the area covered by the water spray emanating from the full-pattern spray nozzle 68 where it is cooled still further before being vented to the atmosphere though the louvered baffle 84 extending across the top of the exhaust duct 66. The full spray pattern of the nozzle 68 is advantageous in this location because the cyclonic motion of the gas and resultant concentration of pollutants adjacent the periphery of the unit are diminished in this region. Also the prevalence of resinous condensate is reduced greatly after its removal in the previous steps, thereby minimizing and nozzle-clogging problem.

Any non-aqueous pollutant vapors remaining in the gas stream as it passes through the spray of spray nozzle 68 are condensed into a moisture that contacts and adheres to the louvers 86 of the louvered baffle 84. The louvers 86 have a substantially W-shaped corrugated cross-section forcing the gas stream to execute a series of sharp-angled turns as it moves through the baffle. At each of these turns a portion of the moisture impinges upon the louvers and adhere thereto. Moisture thus captured drips back into the upper chamber 36 of the scrubber unit and is carried from the unit with the spray water emanating from the various spray nozzles. The drain 81 formed in the base of the lower chamber 34 conveys the spray water from the scrubber unit to the remote water treatment facility 100 described more fully below.

The locations within the scrubber unit 30 at which non-aqueous vapors carried by the gas stream are condensed into a moisture are determined by the condensation temperatures of the pollutants and the temperature gradient experienced by the gas stream as it moves through the gas scrubber, the latter being determined by a number of factors including the temperature of the spray water, the inlet temperature of the gas, and the time required for the gas to pass completely through the scrubber from the inlet duct 38 to the exhaust duct 66. By way of illustration, assume that a hot-air dryer 20 to which a gas scrubber unit 30 of the present invention is connected exhausts a heated gas stream at a temperature of 375° F. carrying the following hypothetical non-aqueous pollutants with condensation temperatures adjusted to allow for operating pressure within the scrubber unit:

| Non-aqueous Pollutant | Condensation Temperature |
| --- | --- |
| A | 350° F. |
| B | 260° F. |
| C | 235° F. |
| D | 180° F. |

As the gas stream passes through the lower chamber 34 it is cooled, by a water spray having a temperature of about 70° F., from a drier exhaust temperature of approximately 375° F. to a temperature of approximately 225° F. at the orifice 56 between the two chambers. This rapid cooling of the gas stream initially upon entering the scrubber unit ensures that the major portion of the non-aqueous pollutant vapors are condensed into a moisture and removed by contact with the spray water while the gas is still in the lower chamber 34. For example, the temperature drop of the gas from 375° to 225° F. causes the hypothetical non-aqueous pollutants A, B and C to condense from a vapor state to a moisture. As the gas stream passes through the upper chamber 36, its temperature continues to drop from a temperature of approximately 225° F. at the orifice 56 to a temperature of approximately 150° F. at the corrugated baffle 84 extending across the top of the exhaust duct 66. This temperature drop of the moving gas stream is suffficient to cause the remaining non-aqueous pollutant D to condense from its vapor state into a moisture before the gas exits the scrubber unit.

In practice, a gas scrubber unit having a lower chamber 34 approximately 24 inches tall and an upper chamber 36 approximately 72 inches tall, both with a cross-sectional area of approximately 31.5 square feet, an inlet dust cross-section of about three square feet and a scrubber exhaust dust cross-section of about seven square feet, and operated at an input gas flow rate of approximately 10,000 cubic feet per minute and a water flow rate of approximately 4.6 gallons per minute per nozzle has satisfied present requirements of the State of Oregon for cleansing an exhaust gas stream from a lumber drier carrying gaseous hydrocarbon pollutants drawn from the wood during the drying process.

Figure 5:
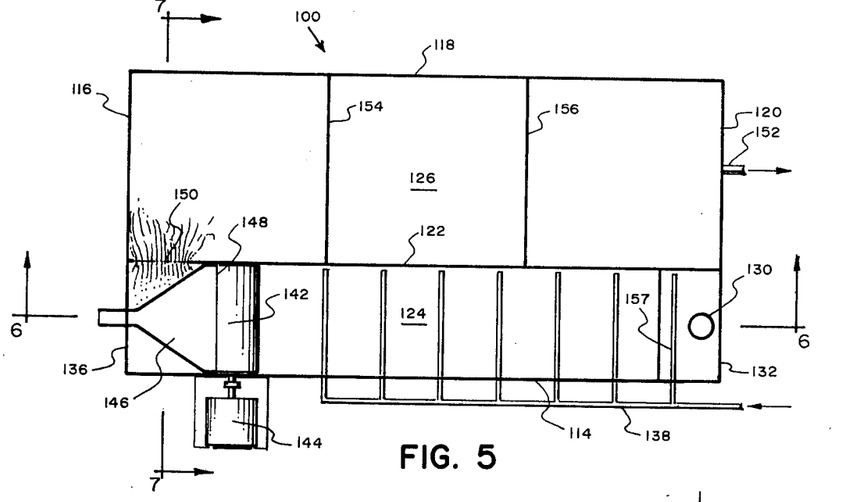
FIG. 5 is a plan view of the water treatment facility of the gas scrubbing system of FIG. 1.
Figure 6:
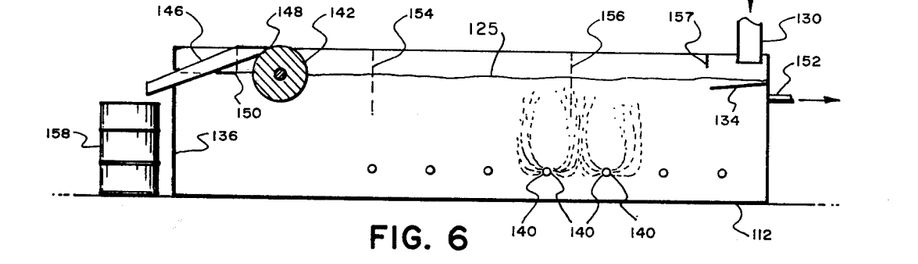
FIG. 6 is a sectional elevation of the water treatment facility taken along line 6—6 of FIG. 5.
Figure 7:
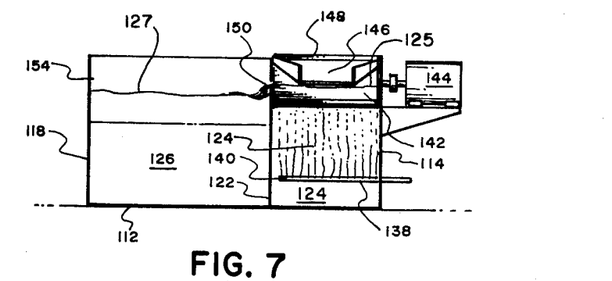
FIG. 7 is a sectional view of the water treatment facility taken along line 7—7 of FIG. 5.

Referring again to FIG. 1, it is seen that the spray water released by the nozzles within each of the scrubber units 30 is conveyed from the scrubber units via a water circulating network 104 to a water treatment facility 100 where it is cleansed of the condensed non-aqueous pollutants before being returned to the scrubber units for reuse. Referring now to FIGS. 5–7, the water treatment facility 100 of the present invention is seen to include a water holding tank having a bottom 112 and sides 114, 116, 118 and 120 and a vertically-oriented baffle 122 interposed between sides 114 and 118 to divide the tank into two separate compartments 124 and 126. A reservoir of spray water is maintained in compartments 124 and 126 at levels 125 and 127, respectively, during periods of system operation.

A water inlet conduit 130 is positioned proximate one end 132 of tank compartment 124 to receive spray water conveyed from the gas scrubber units 30 to the water treatment facility 100 by the water circulating network 104, and an inclined baffle 134 is positioned directly below the inlet 130 to deflect water introduced into the tank compartment thereby outwardly in a substantially horizontal direction toward the opposite end 136 of the tank compartment. Beginning near the end 132 of the tank compartment 124 and extending downstream toward the opposite end 136 of the compartment is a horizontally oriented array 138 of pipes each containing a plurality of air jets 140. Air supplied to these jets under pressure bubbles upwardly toward the surface of the water and thereby both agitates the water and drives any material suspended therein also upwardly toward the surface.

Further downstream from the air jet array is a rotatable drum 142 extending across the surface of the water from the side 114 of the compartment 124 to the baffle 122 separating the two compartments. The drum 142 is partially immersed in the water reservoir contained within the compartment 124, and is rotated in a counter-clockwise direction as seen in FIG. 6 by an electric motor 144 or other suitable means. A trough 146 positioned between the rotatable drum 142 and the end 136 of the tank compartment 124 has a skimmer-edge 148 in sliding contact with the surface of the drum to remove material adhering to the surface of the drum as it is rotated out of the water reservoir. A portion of the baffle 122 separating the two compartments 124 and 126 is depressed in the region between the drum and the side 116 of the tank to form a weir 150 that permits water downstream of the drum in the compartment 124 to overflow into the tank compartment 126.

Thus water entering one end of the tank compartment 124 via the inlet 130 flows to the opposite end of the tank compartment, passing over the array 138 of air jets 140, under the rotating drum 142, and over the weir 150 into the second tank compartment 126. A water outlet pipe 152 connected to the end 154 of the tank compartment 126 opposite the location of weir 150 permits water to be withdrawn from the compartment 126 after flowing over the weir and traveling the full length of the compartment. Spacing approximately midway between weir 150 and the water outlet pipe 152 is a pair of vertically-oriented baffles 154 and 156 that extend completely across the tank compartment 126 from the baffle 122 separating the two compartments to the far side 118. These baffles extend only a short distance below the surface of the water reservoir to permit the water to flow freely thereunder.

In operation, spray water discharged from the gas scrubber units 30 is conveyed to the water treatment facility 100 by the water circulating network 104 and input to the compartment 124 of the tank 110 via the input pipe 130 from which it is deflected substantially horizontally outward toward the opposite end of the tank compartment by the inclined baffle 134. As the water passes over the array 138 of air jets 140, the air bubbling up from the air jets drives non-aqueous condensed pollutants, carried in liquid form by the spray water, upwardly toward the surface of the water contained in the tank where the pollutants are contained by the side 114 of the compartment, the intercompartment baffle 122, the rotating drum 142, and a small baffle 157 extending across the compartment proximate the inlet conduit 130. The upward movement of the pollutants under the action of the air jets takes place even though the specific gravity of the pollutants may be greater than that of water, because of the dynamic upward motion created by the air bubbles. Of course, non-aqueous moisture having a specific gravity less than that of water rises to the surface of the water naturally by floatation; however the action of the air jets hastens the rate at which such pollutants rise. The water current caused by the introduction of water at one end 132 of the tank compartment and the discharge of water over the weir 150 at the opposite end carries the non-aqueous moisture forced to the surface of the water toward the rotating drum 142. On contact with the surface of the drum, the non-aqueous moisture attaches to the drum and is lifted by the drum rotation from the water surface and skimmingly transferred to the trough 146 by the action of the skimmer-edge 148 in sliding contact with the surface of the drum. Although other surfaces might be used, it has been found in practice that a drum surface of substantially smooth machined steel adequate for removing most non-aqueous moisture from the surface of the water. Once transferred to the trough 146, the non-aqueous moisture reclaimed from the spray water is allowed to slide downwardly under its own weight and fall into a suitable receptacle 158.

While the non-aqueous moisture is being removed from the surface of the water by the rotatable drum 142, the water itself flows under the drum and over the weir 150 into the second tank compartment 126 and eventually back to the gas scrubber units 30 via the water outlet pipe 152 and the water circulating network 104. Any non-aqueous moisture floating on the surface of the water as it passes from the first tank compartment 124 into the second tank compartment 126 is captured and retained by the baffles 154 and 156 extending across the width of the second compartment. Tests have shown that the efficiency of the rotating drum 142 in removing non-aqueous moisture from the spray water while it is in the first tank compartment 124 is such that only a very small amount escapes to flow into the second tank compartment 126. Thus, the water surface behind the two baffles 154 and 156 need be manually skimmed of non-aqueous moisture relatively infrequently.

Since substantially only the non-aqueous moisture, and perhaps some particulate matter in some cases, is removed from the spray water as it passes through the water treatment facility 100, the only water that need be added to the gas scrubbing system is principally that which escapes by evaporation while circulating through the system. It should be noted that the water treatment system utilizes a surface skimming technique as the sole means of pollutant removal even though pollutants of specific gravity greater than that of water may be involved. This, in combination with the air jet action, produces a much more rapid and effective separation of the pollutants from the water than could be accomplished by other mechanical means, such as settling, particularly where the pollutants are in condensed liquid form as in the present invention rather than particulate form. In addition, since solely mechanical means, as opposed to chemical means such as flocculants or precipitating agents, are employed to remove the non-aqueous moisture from the spray water, the non-aqueous moisture thereby reclaimed relatively pure and may be readily salvaged for subsequent use or sale if desired.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. An apparatus for removing gaseous non-aqueous pollutants from a moving gas stream comprising:
   a. means defining an elongate, upright enclosure;
   b. gas inlet means formed in the base of said enclosure for permitting the introduction of a stream of gas thereinto and gas outlet means formed in the top of said enclosure for permitting said gas stream to exit therefrom;
   c. gas circulating means within said enclosure for imparting upwardly-directed cyclonic motion to said gas stream; and
   d. a liquid spray nozzle positioned centrally within the horizontal cross-section of said enclosure at a spaced vertical distance above said circulating means, said nozzle including means for directing a spray of liquid radially outward and downward into the path of said circulating gas stream in a swirling cyclonic motion having a direction opposite to that of the cyclonic motion imparted to said gas stream by said circulating means.

2. An apparatus for removing gaseous non-aqueous pollutants from a moving gas stream discharged from an exhaust stack having an upwardly directed exhaust opening by condensation of said pollutants comprising:
   a. means defining an elongate, upright enclosure;
   b. an upwardly directed gas inlet duct formed centrally in the base of said enclosure and connected to said upwardly directed exhaust opening of said exhaust stack for permitting the introduction of a stream of gas centrally upward into said enclosure, and gas outlet means formed in the top of said enclosure for permitting said gas stream to exit therefrom;
   c. gas circulating means within said enclosure above and proximate said gas inlet duct having vertically-oriented vanes positioned at least partially above the interior of said duct for imparting upwardly directed cyclonic motion to said gas stream;
   d. a liquid spray nozzle positioned centrally within the horizontal cross-section of said enclosure at a spaced vertical distance above said circulating means, said nozzle including means for directing a spray of liquid radially outward and downward into the path of said circulating gas stream;
   e. each of said vanes extending above both the interior and exterior of said upwardly directed inlet duct, and a lower edge of each of said vanes sloping downwardly from an interior edge located above the interior of said duct to a portion of each of said vanes located completely outside of said duct so as to conduct moisture collecting upon said vanes from above the interior of said duct to the exterior thereof.

3. An apparatus for removing gaseous non-aqueous pollutants from a moving gas stream by condensation of said pollutants comprising:
   a. means defining a first upright chamber having an upright peripheral wall and a base at its lower end;
   b. a gas inlet duct formed in the base of said first chamber for permitting the introduction of a stream of gas thereinto;
   c. first gas circulating means within said first chamber having vanes for imparting an upwardly directed cyclonic motion to said gas stream about a vertical axis;
   d. first water spray nozzle means positioned centrally within the horizontal cross-section of said first chamber at a spaced vertical distance above said first circulating means for directing a spray of water radially outward and downward into the path of said circulating gas stream and impinging said spray upon said peripheral wall of said first chamber throughout a portion thereof extending from a level proximate the top thereof downwardly to a level proximate the tops of said vanes;
   e. means defining a second upright chamber, having an upright peripheral wall, disposed above said first chamber and above said first spray nozzle means and attached to said first chamber;
   f. means defining an orifice at the juncture between said first and second chambers for permitting said gas stream to pass from said first chamber upwardly into said second chamber;
   g. second gas circulating means within said second chamber having second vanes communicating with said orifice for imparting an upwardly directed cyclonic motion to said gas stream about a vertical axis;
   h. second water spray nozzle means positioned centrally within the horizontal cross-section of said second chamber at a spaced vertical distance above said circulating means for directing a spray of water radially outward and downward into the path of said circulating gas stream and impinging said spray upon said peripheral wall of said second chamber throughout a portion thereof extending from a level proximate the top thereof downwardly to a level proximate the tops of said second vanes;
   i. a gas exhaust duct formed in the top of said second chamber for permitting said gas stream to exit therefrom; and
   j. means in said first chamber for forming a portion of the water sprayed from said first nozzle means into an annular vertical veil around said first gas circulating means, and means for forming at least a portion of the water sprayed from said second nozzle means into a second annular vertical veil around said first gas circulating means generally concentric with said first veil and spaced radially therefrom, said second veil being exterior of said first veil.

4. The apparatus of claim 3 wherein said first chamber has a horizontal cross-section greater than that of said gas inlet duct, and said second chamber has a horizontal cross-section greater than that of said orifice between said first and second chambers.

5. The apparatus of claim 4 wherein said peripheral wall of said second chamber is taller than said peripheral wall of said first chamber and wherein said second water spray nozzle means comprises a pair of water spray nozzles positioned centrally one above the other within said second chamber.

6. A method of removing gaseous non-aqueous pollutants from a moving stream of gas comprising the steps of:
   a. receiving through the base of a first upright chamber a moving gas stream containing said non-aqueous pollutants in vapor form;
   b. imparting an upwardly directed cyclonic motion to said gas stream within said first chamber;
   c. condensing a portion of said pollutant vapors to liquid form within said chamber by exposing said moving gas stream to a water spray having a temperature less than the condensation temperature of said pollutants and thereby cooling said pollutants to their condensation temperature by the transfer of heat from said pollutants to said water spray;
   d. capturing the resultant liquified pollutants within said first chamber by contacting said liquified pollutants with the water from said water spray;
   e. conducting said moving gas stream from the top of said first chamber into the base of a second upright chamber;
   f. further imparting an upwardly directed cyclonic motion to said gas stream in said second chamber;
   g. condensing the remaining portion of said pollutant vapors to liquid form within said second chamber by exposing said moving gas stream to a second water spray having a temperature less than the condensation temperature of said remaining portion of pollutants and thereby cooling said remaining pollutants to their condensation temperature by the transfer of heat to said second water spray;

h. capturing the resulting liquified pollutants within said second chamber by contacting said liquified pollutants with the water from said second water spray; and i. collecting said water with said liquified pollutants contained therein from said respective chambers and exhausting said gas stream from said second chamber.

7. The method of claim 6 including the further step of exposing said moving gas stream to a third water spray in said second chamber, after exposing it to said second water spray, prior to exhausting said gas stream from said second chamber.

8. The method of claim 6 wherein said first upright chamber has an upright peripheral wall and vanes adjacent the base thereof for imparting said upwardly directed cyclonic motion to said gas stream, said step (c) further comprising impinging said water spray upon said peripheral wall throughout a portion thereof extending from a level proximate the top thereof downwardly to a level proximate the tops of said vanes.

* * * * *

UNITED STATES PATENT AND TRADEMARK OFFICE
CERTIFICATE OF CORRECTION

PATENT NO. : 4,008,056
DATED : February 15, 1977
INVENTOR(S) : George Potter

It is certified that error appears in the above–identified patent and that said Letters Patent are hereby corrected as shown below:

| | | |
|---|---|---|
| Col. 3, | Line 51 | Change "respesctive" to --respective--. |
| Col. 4, | Line 59 | Change "were" to --where--. |
| Col. 5, | Line 33 | Change "deflector circulator" to --deflector/circulator--. |
| Col. 7, | Line 16 | Change "and" to --any--. |
| Col. 9, | Line 17 | After "of" insert the word --the--; |
| | Line 20 | Change "Spacing" to --Spaced--; |
| | Line 65 | After "steel" add the word --is--. |
| Col. 10 | Line 42 | After "reclaimed" add the word --remains--. |

Signed and Sealed this

Twenty-sixth Day of April 1977

[SEAL]

Attest:

RUTH C. MASON
Attesting Officer

C. MARSHALL DANN
Commissioner of Patents and Trademarks